United States Patent
Limbacher et al.

(10) Patent No.: US 9,493,073 B2
(45) Date of Patent: Nov. 15, 2016

(54) DEVICE FOR DISPLAYING INFORMATION IN A HYBRID VEHICLE

(71) Applicant: AUDI AG, Ingolstadt (DE)

(72) Inventors: Reimund Limbacher, Ingolstadt (DE); Guenter Schiele, Egweil (DE); Yaokui Xiong, Ingolstadt (DE); Benjamin Gutmayer, Bad Wimpfen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/401,672

(22) PCT Filed: Apr. 30, 2013

(86) PCT No.: PCT/EP2013/001285
§ 371 (c)(1),
(2) Date: Nov. 17, 2014

(87) PCT Pub. No.: WO2013/170928
PCT Pub. Date: Nov. 21, 2013

(65) Prior Publication Data
US 2015/0165907 A1    Jun. 18, 2015

(30) Foreign Application Priority Data
May 16, 2012   (DE) .......................... 10 2012 009 736

(51) Int. Cl.
*B60Q 1/00*        (2006.01)
*B60K 37/02*       (2006.01)
*B60K 37/06*       (2006.01)

(52) U.S. Cl.
CPC .............. *B60K 37/02* (2013.01); *B60K 37/06* (2013.01); *B60K 2350/1092* (2013.01); *B60K 2350/901* (2013.01)

(58) Field of Classification Search
None
See application file for complete search history.

(56) References Cited

U.S. PATENT DOCUMENTS

| | | | | |
|---|---|---|---|---|
| 3,650,345 A | * | 3/1972 | Yardney | B60L 11/12 180/65.25 |
| 3,792,327 A | * | 2/1974 | Waldorf | H02J 3/38 180/65.245 |
| 6,158,541 A | * | 12/2000 | Tabata | B60K 6/28 180/165 |
| 6,324,463 B1 | * | 11/2001 | Patel | B60K 31/185 180/170 |
| 6,480,106 B1 | * | 11/2002 | Crombez | B60R 16/0232 340/438 |

(Continued)

FOREIGN PATENT DOCUMENTS

| CN | 101428613 | 5/2009 |
|---|---|---|
| CN | 102202928 | 9/2011 |

(Continued)

OTHER PUBLICATIONS

English Language Translation of the International Preliminary Report on Patentability for PCT/EP2013/001285, mailed Dec. 18, 2014, 6 pages.

(Continued)

*Primary Examiner* — Firmin Backer
*Assistant Examiner* — Nay Tun
(74) *Attorney, Agent, or Firm* — Staas & Halsey LLP

(57) ABSTRACT

A device for displaying information in a hybrid vehicle has a display instrument which has a plurality of regions for displaying the current operating state of at least one internal combustion engine and at least one electric motor of the hybrid vehicle. The display instrument has a display region in which it is possible to display whether it is possible to drive the hybrid vehicle solely using the electric motor.

15 Claims, 2 Drawing Sheets

(56) References Cited

U.S. PATENT DOCUMENTS

| | | | |
|---|---|---|---|
| 7,091,839 B2* | 8/2006 | Situ | B60K 37/02 340/438 |
| 7,898,405 B2* | 3/2011 | Burke | G01D 11/28 180/65.21 |
| 8,217,620 B2* | 7/2012 | Hanssen | B60K 6/48 320/104 |
| 2005/0068007 A1* | 3/2005 | Prema | B60K 6/445 320/132 |
| 2005/0110445 A1* | 5/2005 | Caussat | B60J 7/0573 318/461 |
| 2006/0113129 A1* | 6/2006 | Tabata | B60K 6/365 180/65.25 |
| 2008/0042615 A1 | 2/2008 | Serrels et al. | |
| 2008/0178792 A1* | 7/2008 | Pala | B60K 37/02 116/288 |
| 2009/0125173 A1* | 5/2009 | Komatsu | B60K 6/445 701/22 |
| 2009/0287366 A1* | 11/2009 | Davis | B60K 6/48 701/22 |
| 2009/0322503 A1* | 12/2009 | Suzuki | B60K 6/445 340/438 |
| 2010/0030413 A1* | 2/2010 | Jinno | B60K 6/445 701/22 |
| 2010/0106351 A1* | 4/2010 | Hanssen | B60K 6/48 701/22 |
| 2010/0156355 A1 | 6/2010 | Bauerle et al. | |
| 2011/0095878 A1* | 4/2011 | Skaff | B60K 6/445 340/441 |
| 2011/0202210 A1* | 8/2011 | Goda | B60L 3/0046 701/22 |
| 2011/0307134 A1* | 12/2011 | Yoshimi | B60K 6/48 701/22 |

FOREIGN PATENT DOCUMENTS

| | | | |
|---|---|---|---|
| DE | 2806728 | 8/1978 | |
| DE | 19533829 | 9/1996 | |
| DE | 19941958 | 11/2000 | |
| DE | 102007033720 | 1/2008 | |
| DE | 102008060265 | 6/2010 | |
| DE | 102009058263 | 8/2010 | |
| DE | 102009035139 | 2/2011 | |
| DE | 102010038258 | 5/2011 | |
| DE | 10 2010 010 446 | 8/2011 | |
| DE | 102010020673 | 11/2011 | |
| DE | 102012009736.0 | 5/2012 | |
| EP | 2082913 | 7/2009 | |
| GB | 1565895 | 4/1980 | |
| JP | EP 2423064 A1 * | 2/2012 | B60K 6/445 |
| WO | WO 2008/056529 | 5/2008 | |
| WO | PCT/EP2013/001285 | 4/2013 | |

OTHER PUBLICATIONS

English language International Search Report for PCT/EP2013/001285, mailed Jul. 26, 2013, 4 pages.

Germany Office Action for German Priority Patent Application No. 10 2012 009 736.0, issued Feb. 8, 2013, 5 pages.

http://www.oh-e-mini.blogspot.com/ ; Downloaded Jun. 30, 2011, 1 page.

Chinese Office Action dated Apr. 29, 2016 from Chinese Patent Application No. 201380025070.6, 8 pages.

* cited by examiner

DEVICE FOR DISPLAYING INFORMATION IN A HYBRID VEHICLE

CROSS REFERENCE TO RELATED APPLICATIONS

This application is based on and hereby claims priority to International Application No. PCT/EP2013/001285 filed on Apr. 30, 2013 and German Application No. 10 2012 009 736.0 filed on May 16, 2012, the contents of which are hereby incorporated by reference.

BACKGROUND

The invention relates to a device for displaying information in a hybrid vehicle.

Hybrid vehicles, that is to say motor vehicles which have both an internal combustion engine and also an electric motor and which, as alternatives, can be driven solely by the internal combustion engine, solely by the electric motor and both by the internal combustion engine and also by the electric motor, are known from the general related art and have become more widespread in recent times. A particular advantage of these hybrid vehicles is that it is possible to use only the electric motor to drive said hybrid vehicles, as a result of which quiet and emission-free operation thereof are equally possible. To this end, known hybrid vehicles, such as a hybrid vehicle manufactured by the applicant under the name "Q5 hybrid" for example, have a switch or a button which the driver can operate in order to effect purely electric driving of the hybrid vehicle, that is to say operation in which the hybrid vehicle is driven solely using the electric motor. However, certain conditions have to be met for purely electric operation of the hybrid vehicle in this way. Since purely electric operation of the hybrid vehicle is usually already prevented when one of the conditions is not met, situations often occur in practice in which the driver has operated the button for purely electric driving but operation of this kind is not possible and this is displayed to the driver, for example, on the display instrument. Firstly, this may be disappointing to the driver and secondly it may stop him from operating the button for purely electric driving in the future.

A further problem is that the conditions which have to be met for purely electric driving are very complex and therefore cannot be directly identified by and also are not clear to the driver, and therefore it is not constructive to display these conditions to the driver.

A display device for a hybrid vehicle is described in EP 2 082 913 A1. In this document, a display instrument has a bar which can have a variable length in order to display to a driver the power of the hybrid vehicle during purely electric operation, called the EV mode, of the hybrid vehicle.

DE 10 2008 060 265 A1 discloses a display arrangement for a hybrid vehicle in which an appropriate symbol is used to display to the driver when only limited operation of the vehicle battery is possible in the event of a specific temperature being exceeded or undershot. Furthermore, the display arrangement has a battery charge display.

A device for monitoring the drive power in a hybrid vehicle is described in DE 195 33 829 C1. In this document, a display instrument is provided, said display instrument having a region marking for the current drive power, it being possible for the position of said region marking to be changed. As a result, a power which can be achieved by switching on the electric motor is displayed to the driver.

US 2009/0125173 A1 discloses a display unit in a hybrid vehicle having a speedometer, for displaying the temperature and for displaying the cooperation between the internal combustion engine and the electric motor.

A display device for an electric hybrid vehicle is described in DE 10 2010 020 673 A1. The display device has a first and a second display region which represent a first and a second hybrid mode of the hybrid vehicle. In this case, information is displayed and said information can be used to inform an operator how close the electric hybrid vehicle is to entering an electric vehicle mode or leaving said mode.

SUMMARY

One possible object is to provide a device for displaying information in a hybrid vehicle, which device allows the driver of the hybrid vehicle to identify when purely electric operation of the hybrid vehicle is possible.

The display region, which is provided in the display instrument proposed by the inventors, can display to the driver whether driving of the hybrid vehicle solely using the electric motor, that is to say purely electric driving of the hybrid vehicle, is possible. As a result, the driver of the hybrid vehicle which is equipped with the proposed device is constantly informed about whether he can operate his hybrid vehicle purely electrically and the situation of the driver, under certain circumstances, operating a button, which is intended to allow purely electric driving of the hybrid vehicle, several times to no effect is avoided. The final effect is that the driver is encouraged to effect sole driving of the hybrid vehicle using the electric motor when this is possible.

In order to display to the driver how far away he is from the possibility of driving the hybrid vehicle solely using the electric motor, provision may be made in one advantageous development for the display region to be divided into a plurality of sections, wherein it is possible to display the degree of availability of electrical drive components of the hybrid vehicle for purely electric driving of the hybrid vehicle by the sections.

In this case, a very clear representation of the display region can be achieved when the plurality of sections of the display region are formed by respective light-emitting elements.

However, as an alternative to this, it is also possible, in another embodiment, for the display instrument to have a needle which can move over the display region.

An embodiment which is very simple and therefore cost-effective to implement may be that the display region has a single light-emitting element.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
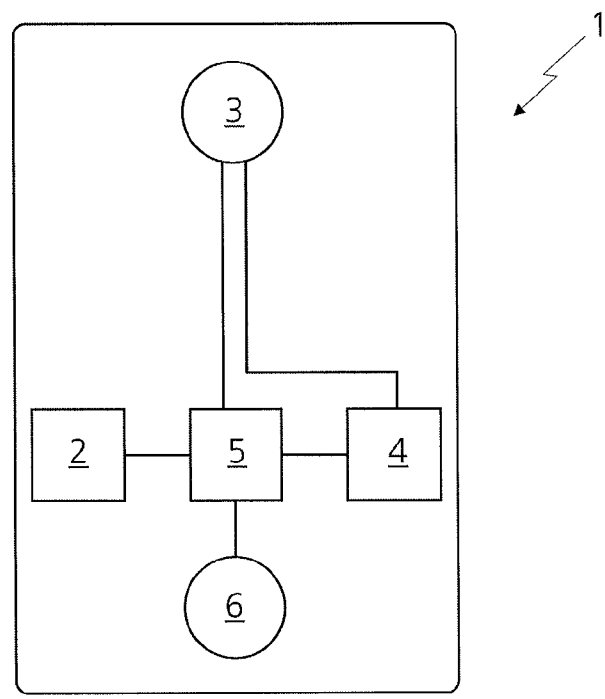
FIG. 1 shows a highly schematic illustration of a hybrid vehicle having the proposed display device.

Reference will now be made in detail to the preferred embodiments of the present invention, examples of which are illustrated in the accompanying drawings, wherein like reference numerals refer to like elements throughout.

FIG. 1 shows a highly schematic illustration of a hybrid vehicle 1 which has an internal combustion engine 2 and an electric motor 3 for drive purposes. The hybrid vehicle 1 could, in principle, also have more than the one electric motor 3. The hybrid vehicle 1 furthermore has a traction battery 4 which supplies electrical energy to the electric motor 3 in a manner which is known per se. A control arrangement 5, which is in the form of a motor controller or is integrated in a motor controller for example, is also provided, said control arrangement being able to perform various functions which are known per se and, to this end, being connected to the internal combustion engine 2, to the electric motor 3 and to the traction battery 4 in the present case. Furthermore, the control arrangement 5 is connected to a device 6 for displaying information, said device preferably being located in a passenger compartment, not illustrated, of the hybrid vehicle 1. The design of the hybrid vehicle which is illustrated in FIG. 1 should be considered to be purely exemplary and the device 6 which is described in the text which follows could also be used in other kinds of hybrid vehicle.

Figure 2:
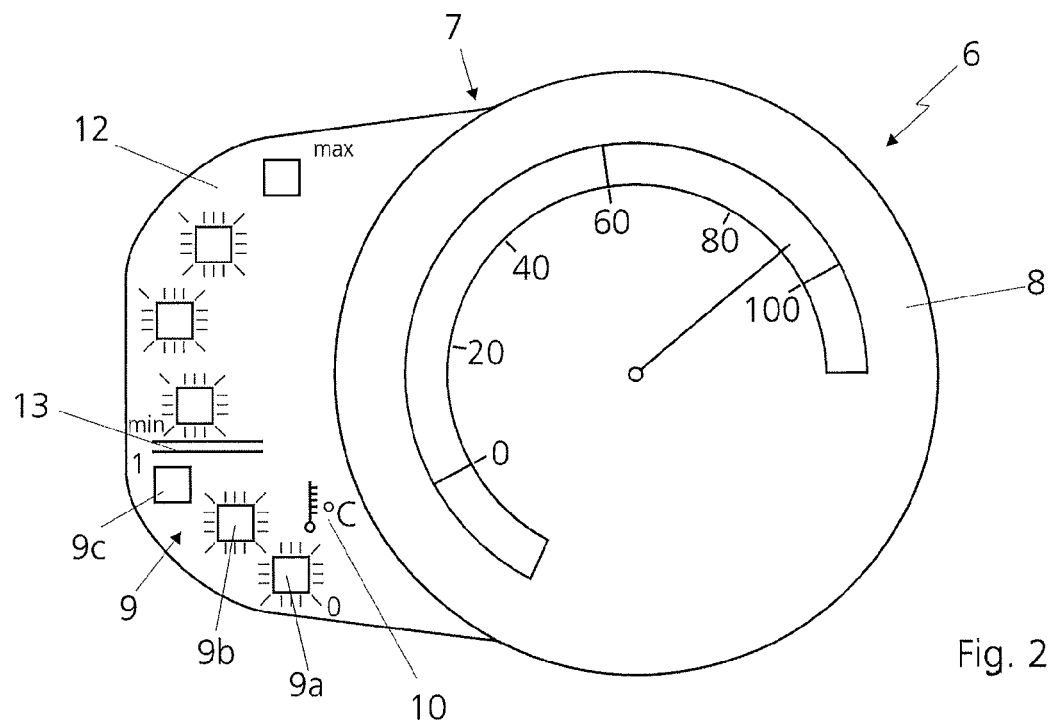
FIG. 2 shows a first embodiment of the proposed device.
Figure 3:
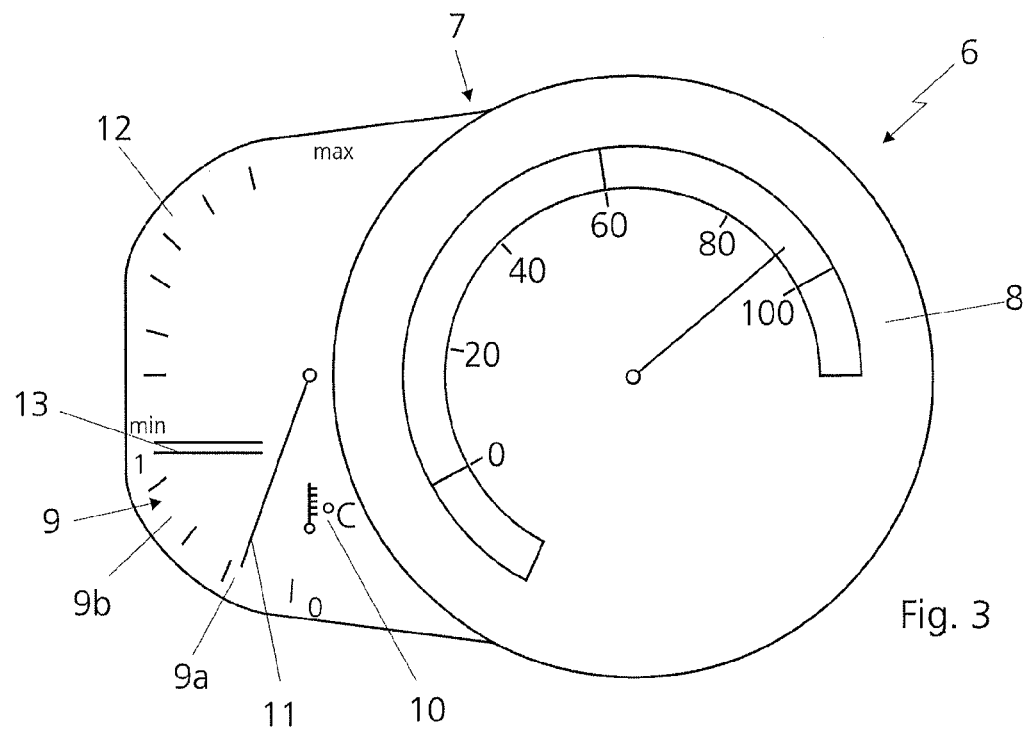
FIG. 3 shows a second embodiment of the proposed device.
Figure 4:
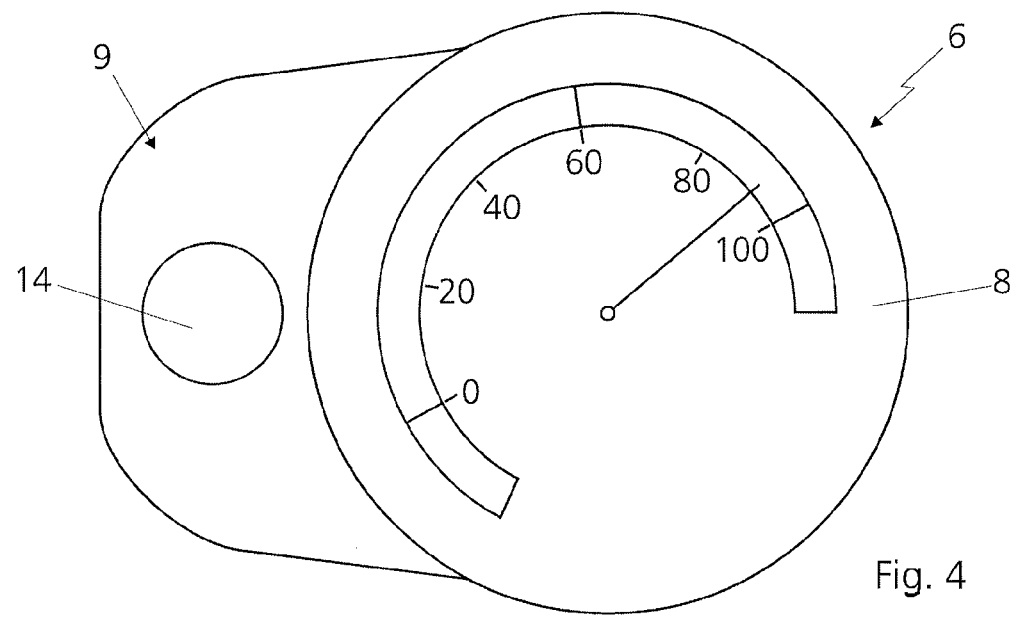
FIG. 4 shows a third embodiment of the proposed device.

FIGS. 2, 3 and 4 illustrate different embodiments of the device 6 for displaying information in the hybrid vehicle. The device 6 is preferably part of an instrument panel, not illustrated in its entirety, of the hybrid vehicle 1 and has a display instrument 7 which has a plurality of regions for displaying the current operating state of the internal combustion engine 2 and of the electric motor 3 of the hybrid vehicle. That region 8 of the display instrument 7 which forms the right-hand part of the display instrument 7 in FIGS. 2, 3 and 4 shows the operating state of the electric motor 3 in the present case. Since this region 8 of the display instrument 7 can be designed in a manner which is known, for example, from the "Q5 hybrid" hybrid vehicle, said region will not be discussed any further in the text which follows. The region 8 of the display instrument 7 is of identical design in all of the embodiments of FIGS. 2, 3 and 4. However, this is not absolutely necessary and other combinations of the display instrument 7 which is described in the text which follows are also possible.

Furthermore, the display instrument 7 has a display region 9 which is designed differently in each of the individual embodiments of FIGS. 2, 3 and 4 and which adjoins the region 8 of the display instrument 7 in the present case. The display region 9 can display to the driver of the hybrid vehicle 1 whether driving of the hybrid vehicle 1 solely by the electric motor 3, that is to say without the use of the internal combustion engine 2, is possible. To this end, the display region 9 is divided into a plurality of sections 9a, 9b, . . . in the embodiments of FIGS. 2 and 3. In said Figures, three sections 9a, 9b and 9c are illustrated by way of example in the embodiment according to FIG. 2, whereas only two sections 9a and 9b are provided in the embodiment of FIG. 3. However, the number of sections 9a, 9b, . . . of the display region 9 is arbitrary in principle and can depend on various factors. The sections 9a, 9b, . . . can be used to display the degree of availability of electrical drive components of the hybrid vehicle 1, that is to say of the electric motor 3 amongst others, but also of further electrical drive components of the hybrid vehicle 1 which are known per se, for purely electric driving of the hybrid vehicle 1. A symbol 10 is also provided in the display region 9 in FIGS. 2 and 3, said symbol indicating the temperature dependency of the electrical drive components of the hybrid vehicle 1 and it being possible for said symbol to merely be printed on in a simple embodiment. It is also feasible to illuminate the symbol 10.

In the embodiment of FIG. 2, the sections 9a, 9b and 9c of the display region are formed by respective light-emitting elements which can be designed, for example, as LEDs. In this case, the individual sections 9a, 9b and 9c of the display region 9 can each be associated with one of the reasons for which purely electric operation of the hybrid vehicle 1 is prevented cited in the text which follows. The driver can identify how far away he is from purely electric operation of the hybrid vehicle 1, that is to say approximately how long until it is possible to drive the hybrid vehicle 1 solely using the electric motor 3, from the number of illuminated sections 9a, 9b and 9c. In the present case, the two sections 9a and 9b are illuminated for example, whereas the section 9c is not illuminated. This signals to the driver that it is currently not possible to drive the hybrid vehicle 1 solely using the electric motor 3. In a manner which is not illustrated, the light-emitting elements which form the sections 9a, 9b and 9c can be of different colors which are associated with different reasons which display the current inability to solely drive the hybrid vehicle 1 using the electric motor 3.

Reasons for which the hybrid vehicle 1 cannot be driven solely by the electric motor 3 may include, amongst others, the temperature of the traction battery 4, the state of charge of the traction battery 4, the availability of a starter system, not illustrated, for the internal combustion engine 2, the height of the hybrid vehicle 1 above sea level and the associated air pressure, the traveling speed of the hybrid vehicle 1 or the temperature of further components which are involved in driving the hybrid vehicle 1.

In order to check whether all of the necessary criteria for solely operating the hybrid vehicle 1 by the electric motor 3 are met, the control arrangement 5 uses said criteria and ensures that the driver is shown in the display region 9 of the display instrument 7 whether the hybrid vehicle 1 can be operated solely by the electric motor 3, that is to say without the internal combustion engine 2. If this is the case, that is to say if the driver is shown in the display region 9 that said purely electric operation of the hybrid vehicle 1 is possible, said driver can operate a button, not illustrated, within the hybrid vehicle 1, which then establishes purely electric operation of the hybrid vehicle 1.

The abovementioned criteria and also the determination of said criteria by the control arrangement 5 and the associated control of the electric motor 3 and of the internal combustion engine 2 by the control arrangement 5 also apply to the embodiments of the display instrument 7 which are illustrated in FIGS. 3 and 4.

In the embodiment of FIG. 3, the display instrument 7 has a needle 11 which can move over the display region 9. The position of the needle 11 in the display region 9 preferably depends on the current availability of the electric motor 3 or of the electrical drive components of the hybrid vehicle 1. Since the display region 9 has the two sections 9a and 9b in the embodiment of FIG. 3 as described above, a driver can identify how far away he is from purely electric operation of the hybrid vehicle 1 from the position of the needle 11. In this case, the needle 11 can preferably move in a continuously variable manner over the display region 12.

In the embodiments of the display instrument 7 according to FIGS. 2 and 3, a further region 12 of the display instrument 7 directly adjoins the display region 9 for displaying sole driving of the hybrid vehicle 1 using the electric motor 3. In this region 12, which represents a subregion of the display region 9, further information about the state of the traction battery 4, for example about the state of charge of said traction battery, can be displayed for example, so that the driver identifies for how long purely electric operation is still possible. Furthermore, a theoretically possible range which the hybrid vehicle 1 can cover with purely electric operation can also be displayed to the driver, for example, in the region 12.

In the embodiment of FIG. 2, a plurality of further light-emitting elements, which can be designed as LEDs for example, are provided in the region 12. The number of illuminated light-emitting elements in the region 12 provides the driver with information about the state of charge of the traction battery 4 in the present case. Therefore, the light-emitting elements in the region 12 also form a scale value. The light-emitting elements in the region 12 can be of a different color to the light-emitting elements which form the sections 9a, 9b and 9c of the display region 9. It is clear from the exemplary situation according to FIG. 2, in which three light-emitting elements in the region 12 are illuminated, that the state of charge of the traction battery 4 can be displayed to the driver even when purely electric operation of the hybrid vehicle 1 is not possible. In this case, provision can be made for the light-emitting elements in the region 12 to light up only weakly or to be dimmed when purely electric operation of the hybrid vehicle 1 is not possible. It may optionally also be possible for the light-emitting elements in the region 12 to not light up when purely electric operation of the hybrid vehicle 1 is not possible, that is to say for the light-emitting elements in the region 12 to be able to light up only when all of the light-emitting elements which form the sections 9a, 9b and 9c light up.

In the embodiment of FIG. 3, the needle 11 also moves into the region 12, specifically when driving of the hybrid vehicle 1 solely by the electric motor 3 is possible.

In the embodiments of FIG. 2 and FIG. 3, an optical separation in the form of a boundary line 13 which, in this case, has two individual lines, is provided between the display region 9 and the adjoining region 12 in the present case. The illumination of all of the light-emitting elements, which are arranged in the display region 9, in the embodiment of FIG. 2 and overshooting of the boundary line 13 by the needle 11 in the embodiment of FIG. 3 show the driver that purely electric operation of the hybrid vehicle 1 is possible or that the hybrid vehicle 1 is already being operated in a purely electric manner.

In the two embodiments of FIGS. 2 and 3, the lower end of the display region 9 is identified by the numeral "0", and the upper end, that is to say the end facing the boundary line 13, is identified by the numeral "1". As a result, the driver can even more clearly identify when purely electric operation of the hybrid vehicle 1 is possible. Similarly, the label "min" is located at the lower end, that is to say the end which faces the boundary line 13, of the region 12, whereas the upper end of the region 12 has the label "max". In this way, the state of charge of the traction battery 4 is displayed even more clearly to the driver. It goes without saying that other display options would also be feasible in each case.

FIG. 4 shows a comparatively simple embodiment of the display region 9 which has only a single light-emitting element 14 which can display the availability of sole driving of the hybrid vehicle 1 using the electric motor 3. In this embodiment, the display region 9 with the light-emitting element 14 is independent of the region 8 of the display instrument 7.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A device for displaying information in a hybrid vehicle having an internal combustion engine, an electric motor and a button for purely electric driving in which the hybrid vehicle is driven solely using the electric motor, the device comprising:

an electronic display instrument installed in the hybrid vehicle comprising:
a first display region to display a current operating state of the hybrid vehicle; and
a second display region to display an indication whether the hybrid vehicle is capable of being switched, by operation of the button, to a state of purely electric driving,
wherein
the button is configured to request the hybrid vehicle to be operated solely using the electric motor when operated,
when the indication indicates the hybrid vehicle is capable of being switched to the state of purely electric driving while the hybrid vehicle is operated using the internal combustion engine and a switch to the state of purely electric driving is first requested by operation of the button, the operation of the button causes the hybrid vehicle to be operated solely using the electric motor, and
the operation of the button is performed only once between a time the switch to the state of purely electric driving was first requested and a time that the hybrid vehicle switches from driving using the internal combustion engine to the state of purely electric driving.

2. The device as claimed in claim 1, wherein
the hybrid vehicle has a plurality of electrical drive components, including the electric motor and at least one other component, which function in purely electric driving, and
the second display region is divided into a plurality of sections that display a degree of availability of the electrical drive components for purely electric driving.

3. The device as claimed in claim 2, wherein
each section of the second display region provides information regarding the availability of one of the electrical drive components, for purely electric driving.

4. The device as claimed in claim 2, wherein
the plurality of sections of the second display region are formed by respective light-emitting elements.

5. The device as claimed in claim 1, wherein
the display instrument has a needle which can move over the second display region.

6. The device as claimed in claim 5, wherein
the needle has a position on the second display region that depends on a degree of availability of the electrical drive components for purely electric driving.

7. The device as claimed in claim 1, wherein
the second display region has a single light-emitting element.

8. The device as claimed in claim 1, wherein
the hybrid vehicle has a plurality of electrical drive components, including the electric motor and at least one other component, whether it is possible to drive the hybrid vehicle solely using the electric motor depends on a temperature of the electrical drive components of the hybrid vehicle,
a symbol is provided in the second display region, and
the symbol indicates how temperature affects the availability of purely electric driving.

9. The device as claimed in claim 1, wherein
the second display region is independent from the first display region.

10. The device as claimed in claim 1, wherein
the second display region adjoins the first display region.

11. The device as claimed in claim 1, wherein
the device further comprises a control device connected to the display instrument, to determine whether it is possible to drive the hybrid vehicle solely using the electric motor, and
the control device determines whether it is possible to the drive hybrid vehicle solely using the electric motor based on criteria selected from the group consisting of a temperature of a traction battery, a state of charge of the traction battery, an availability of a starter system for the internal combustion engine, a height of the hybrid vehicle above sea level, a traveling speed of the hybrid vehicle and a temperature of further components which are involved in driving the hybrid vehicle.

12. The device as claimed in claim 1, wherein the display of the second display region is continuous such that, when the hybrid vehicle is operating, a driver of the hybrid vehicle is constantly informed about whether it is possible to drive the hybrid vehicle solely using the electric motor.

13. The device as claimed in claim 1, wherein
the second display region is divided into a plurality of sections formed by respective light-emitting elements that, according to an operation status thereof, represent a degree of availability of electrical drive components which function in purely electric driving.

14. The device as claimed in claim 13, wherein
when a portion of the light-emitting elements are lighted, the electrical drive components are not ready for purely electric driving,
when all of the light-emitting elements are lighted, the electrical drive components are ready for purely electric driving, and
the portion of the light-emitting elements which are lighted corresponds to an amount of time remaining before the electrical drive components are ready for purely electric driving.

15. The device as claimed in claim 1, wherein
the display instrument further comprises:
    a third display region adjoining the second display region to display a current electric motor operating state during purely electric driving; and
    a needle configured to move over the second display region before the hybrid vehicle is determined to be capable of being operated solely using the electric motor and to move over the third display region after the hybrid vehicle is determined to be capable of being operated solely using the electric motor,
wherein the needle indicates a degree of availability of electrical drive components which function in purely electric driving while the needle moves over the second display region, and the needle indicates the current electric motor operating state while the needle moves over the third display region.

* * * * *